United States Patent
Oyama et al.

(10) Patent No.: US 8,693,036 B2
(45) Date of Patent: Apr. 8, 2014

(54) DISTRIBUTION PROCESSING METHOD, DISTRIBUTION PROCESSING DEVICE, PRINT DATA PROCESSING METHOD, PRINT DATA PROCESSING DEVICE, AND RECORDING MEDIUM

(75) Inventors: Hitoshi Oyama, Matsumoto (JP); Tadashi Furuhata, Shiojiri (JP); Akio Takamoto, Matsumoto (JP); Tomohiro Kodama, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 296 days.

(21) Appl. No.: 13/225,932

(22) Filed: Sep. 6, 2011

(65) Prior Publication Data
US 2012/0057202 A1 Mar. 8, 2012

(30) Foreign Application Priority Data

Sep. 6, 2010 (JP) ................... 2010-199155
Sep. 10, 2010 (JP) ................... 2010-202776

(51) Int. Cl.
*G06F 3/12* (2006.01)
(52) U.S. Cl.
CPC ..................... *G06F 3/123* (2013.01)
USPC ........................... 358/1.15; 358/1.6
(58) Field of Classification Search
USPC .................. 358/1.6, 401, 1.15; 711/200, 203
See application file for complete search history.

(56) References Cited

U.S. PATENT DOCUMENTS

| | | | |
|---|---|---|---|
| 5,678,059 A | 10/1997 | Ramaswamy et al. | |
| 7,014,110 B2 | 3/2006 | Minowa et al. | |
| 7,239,413 B2 * | 7/2007 | Owen et al. | 358/1.15 |
| 7,454,762 B2 | 11/2008 | Brake, Jr. et al. | |
| 7,731,084 B2 * | 6/2010 | Redick et al. | 235/379 |
| 8,348,750 B2 * | 1/2013 | Jordan et al. | 463/25 |
| 8,526,045 B2 | 9/2013 | Furuhata et al. | |
| 2001/0032266 A1 | 10/2001 | Minowa | |
| 2002/0089687 A1 | 7/2002 | Ferlitsch et al. | |
| 2002/0154333 A1 | 10/2002 | Akashi | |
| 2003/0036979 A1 | 2/2003 | Tokorotani | |

(Continued)

FOREIGN PATENT DOCUMENTS

EP 1 764 680 A2 3/2007
JP 08-69427 3/1996

(Continued)

OTHER PUBLICATIONS

Extended European Search Report issued Dec. 27, 2011 for Application No. 11179255.2 (6 pages).

*Primary Examiner* — Jerome Grant, II
(74) *Attorney, Agent, or Firm* — Nutter McClennen & Fish LLP; John J. Penny, Jr.; Christina M. Sperry

(57) ABSTRACT

Data output from an existing application to specific devices can be easily distributed to plural devices. A method of distributing device-specific data output from an application on a computer that executes a specific process according to an application and has two or more communication ports causes the computer to execute a step of acquiring device-specific data output by an executed program to one specific communication port at the operating system kernel layer before the device-specific data is received at the communication port; and a step of analyzing the device-specific data acquired at the application layer, determines the device to which the device-specific data, and outputs the device-specific data to the communication port to which the device is connected.

16 Claims, 4 Drawing Sheets

(56) References Cited

U.S. PATENT DOCUMENTS

| | | |
|---|---|---|
| 2005/0028093 A1 | 2/2005 | Michel et al. |
| 2005/0211773 A1 | 9/2005 | Nobutani |
| 2008/0165285 A1* | 7/2008 | Thompson et al. ........... 348/554 |
| 2009/0066996 A1 | 3/2009 | Minowa |
| 2009/0237717 A1 | 9/2009 | Takamoto et al. |
| 2011/0184822 A1* | 7/2011 | Matkovic ........................ 705/18 |
| 2012/0057184 A1 | 3/2012 | Furuhata et al. |
| 2012/0069404 A1 | 3/2012 | Kodama et al. |
| 2013/0057885 A1 | 3/2013 | Minowa |

FOREIGN PATENT DOCUMENTS

| | | | |
|---|---|---|---|
| JP | 2005/321873 A | | 11/2005 |
| JP | 2006/338443 A | | 12/2006 |
| JP | 2006-338443 | * | 10/2009 |
| JP | 2009/226689 A | | 10/2009 |
| JP | 2009/226690 A | | 10/2009 |
| KR | 2007-0107765 A | | 11/2007 |

* cited by examiner

US 8,693,036 B2

DISTRIBUTION PROCESSING METHOD, DISTRIBUTION PROCESSING DEVICE, PRINT DATA PROCESSING METHOD, PRINT DATA PROCESSING DEVICE, AND RECORDING MEDIUM

This application claims priority under 35 U.S.C. §119 to Japanese Application No. 2010-199155 filed on Sep. 6, 2010 and Japanese Application No. 2010-202776 filed on Sep. 10, 2010, both of which are incorporated by reference in their entireties.

BACKGROUND

1. Technical Field

The present invention relates to a method of processing data that is output from an existing application to various devices, and relates more particularly to a method of distributing data specific to individual devices without changing an existing application program, to a distribution processing device, a print data processing method, a print data processing device, and a recording medium.

2. Related Art

Point-of-Sale (POS systems), which are a type of sales management system, are commonly used in supermarkets and other retail stores. The POS server and plural POS terminals (registers) of a POS system are connected over a network, and each operates and runs specific processes based on the applications installed in each device. Peripherals such as a printer and display are normally connected to each POS terminal, and output receipts and coupons, and display information for the users, as instructed by the application. Systems that are architecturally similar to POS systems and output information in various forms are also deployed in businesses such as hospitals and shipping companies.

Once such a system is deployed, however, adding new functions and replacing system components is often necessary as technology improves and business needs change. However, because such systems are usually central to business operations, and are connected to other systems in complex ways, modifying the applications that are used is not easy.

To address this problem as it relates to output processing, Japanese Unexamined Patent Appl. Pub. JP-A-H08-69427 teaches a device that performs a modem function in a personal computer that can eliminate the microprocessor and memory required in a conventional modem without needing to modify the existing application program.

Japanese Unexamined Patent Appl. Pub. JP-A-2006-338443 teaches a device that can access one communication port and cause a printer connected to another communication port to simultaneously print a duplicate copy without modifying the application program.

JP-A-1108-69427 and JP-A-2006-338443 only address limited output system functions such as the modem and a duplicate printing function, however, and do not address many other needs. In addition, because JP-A-2006-338443 operates at the operating system kernel level, constructing new functions (program development) is not generally easy and function is limited.

As printer functions improve, increasing output functionality by replacing or increasing the number of printers, and using different printers for different functions according to the application, are also desired.

There are also devices that connect a printer and a display to a single communication port, and switch between the devices as needed. When such a device is replaced with discrete devices connected to different communication ports, it is also necessary to easily change the system without changing the existing application program.

SUMMARY

An object of at least one embodiment of the present invention is to provide a method of processing data output from an existing application to various devices, and more particularly to provide a distribution processing method and device that can easily distribute data to different devices without changing the existing application program.

A first aspect of at least one embodiment of the invention is a distribution processing method that runs on a computer that operates according to an operating system on the operating system kernel layer, executes a specific process according to an application on an application layer, and has two or more communication ports, and applies a distribution process to device-specific data output from the application, the distribution processing method including: a data acquisition step in which the computer acquires device-specific data output to one specific communication port at the operating system kernel layer before the device-specific data is received at the communication port; and a data processing step in which the computer analyzes the device-specific data acquired in the data acquisition step at the application layer, determines the device to which the device-specific data is output based on the data analysis, and outputs the device-specific data to the communication port to which the device is connected.

In a distribution processing method according to another aspect of at least one embodiment of the invention, the device is a printing device and a display device; and the device-specific data output from the application is data for the printing device or data for the display device.

In a distribution processing method according to another aspect of at least one embodiment of the invention, the number of devices is two; and when a device selection signal is contained in the device-specific data output from the application, the output device is determined based on the selection signal.

Another aspect of at least one embodiment of the invention is a distribution processing device that is a computer that operates according to an operating system on the operating system kernel layer, executes a specific process according to an application on an application layer, has two or more communication ports, and applies a distribution process to device-specific data output from the application, the distribution processing device including: a data acquisition unit that acquires device-specific data output to one specific communication port at the operating system kernel layer before the device-specific data is received at the communication port; and a data processing unit that analyzes the device-specific data acquired by the data acquisition unit at the application layer, determines the device to which the device-specific data is output based on the data analysis, and outputs the device-specific data to the communication port to which the device is connected.

Another aspect of at least one embodiment of the invention is a print data processing method that runs on a computer that operates according to an operating system on the operating system kernel layer, executes a specific process according to an application on an application layer, and has two or more communication ports, and processes print data output from the application, the print data processing method including: a data acquisition step in which the computer acquires the print data output to a specific communication port at the operating system kernel layer before the print data is received at the communication port; and a print data processing step in which the computer analyzes the print data acquired in the data acquisition step at the application layer, determines one or more communication ports to which the print data is output based on the data analysis, converts the print data to data suitable for the device connected to the identified communication port, and outputs the converted print data to the identified communication port.

Further preferably in another aspect of at least one embodiment of the invention, the communication port is determined in the print data processing step based on a text string or image detected in the acquired print data.

In another aspect of at least one embodiment of the invention, two or more communication ports are identified as the communication ports to which the print data is output, and the content of print data output to each communication port is a subset of the acquired print data content.

In another aspect of at least one embodiment of the invention, two or more communication ports are identified as the communication ports to which the print data is output, and print data of the same content is output to each communication port.

In yet another aspect of at least one embodiment of the invention, one communication port is determined based on the print data content as the communication port to which the print data is output.

Another aspect of at least one embodiment of the invention is a print data processing device that is a computer that operates according to an operating system on the operating system kernel layer, executes a specific process according to an application on an application layer, has two or more communication ports, and processes print data output from the application, the print data processing device including: a data acquisition unit that acquires the print data output to the specific communication port at the operating system kernel layer before the print data is received at the communication port; and a print data processing unit that analyzes the print data acquired by the data acquisition unit at the application layer, determines one or more communication ports to which the print data is output based on the data analysis, converts the print data to data suitable for the device connected to the identified communication port, and outputs the converted print data to the identified communication port.

Another aspect of at least one embodiment of the invention is a recording medium that is computer-readable and records a program that causes a computer to execute the steps of the data distribution processing method described above. The recording medium can be a tangible recording medium or a non-transitory recording medium.

Other objects and features together with a fuller understanding of the invention will become apparent and appreciated by referring to the following description and claims taken in conjunction with the accompanying drawings.

DESCRIPTION OF EMBODIMENTS

Figure 1:
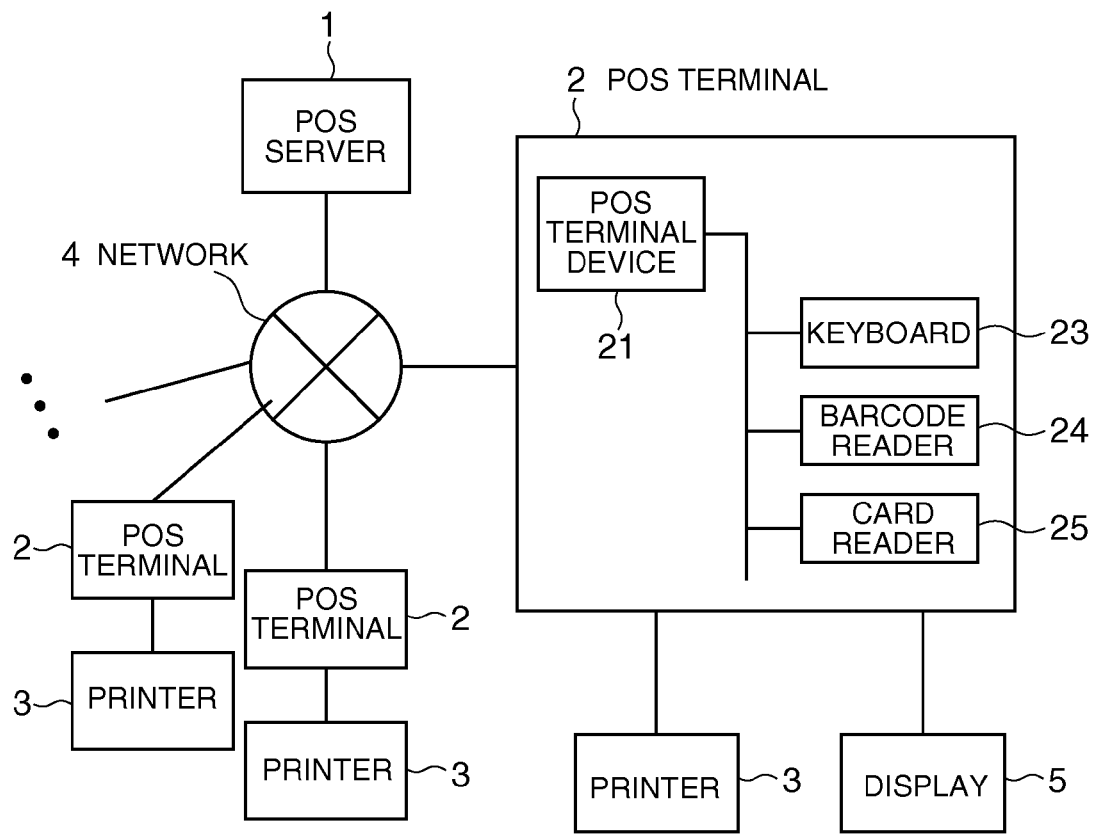
FIG. 1 is a block diagram showing the configuration of a POS system and POS terminal devices according to the invention.

Preferred embodiments of the present invention described below with reference to the accompanying figures.

The following embodiments do not, however, limit the scope of the invention as described in the following claims. Note, further, that identical or like parts are referenced by like reference numerals in the accompanying figures.

POS Terminal Configuration

The configuration of a POS terminal according to the invention is described next with reference to FIG. 1. FIG. 1 shows an example of a POS terminal according to this embodiment of the invention.

This embodiment of the invention addresses a POS system such as used in a supermarket, and as shown in FIG. 1 has a plurality of POS terminals 2 connected through a network 4 to a POS server 1. The POS server 1 is a computer system that manages the plural POS terminals 2, and runs processes to tabulate and manage data acquired from the POS terminals 2.

A POS terminal 2 is installed at each register, and is connected to a printer 3. The printer 3 outputs receipts and coupons based on print data contained in device-specific data output from the POS terminal 2. The POS terminal 2 is thus positioned as the host device of the printer 3.

A display 5 is also connected to the POS terminal 2, and product prices, for example, are displayed for the customer on the display according to display data contained in the device-specific data output from the POS terminal 2.

As shown in FIG. 1, each POS terminal 2 includes a POS terminal device 21, keyboard 23, barcode reader 24, and card reader 25. The keyboard 23 is used by the operator to input product information including prices and product codes, and customer information such as sex or age. The barcode reader 24 is used to get product information by reading product barcodes. The card reader 25 reads information stored on a card and retrieves information needed to complete the transaction.

The POS terminal device 21 generates and outputs information printed on the receipts or coupons to the printer 3 based on information acquired by the keyboard 23, barcode reader 24, and card reader 25, or generates and outputs information to be displayed to the display 5. The POS terminal device 21 is a computer including a CPU, RAM, ROM, and hard disk drive or other storage device not shown. A POS application 201 program described below and a program for data distribution processing are stored in ROM, and processes are executed by the CPU operating according to these programs.

POS Terminal Functions

Embodiment 1

Figure 2:
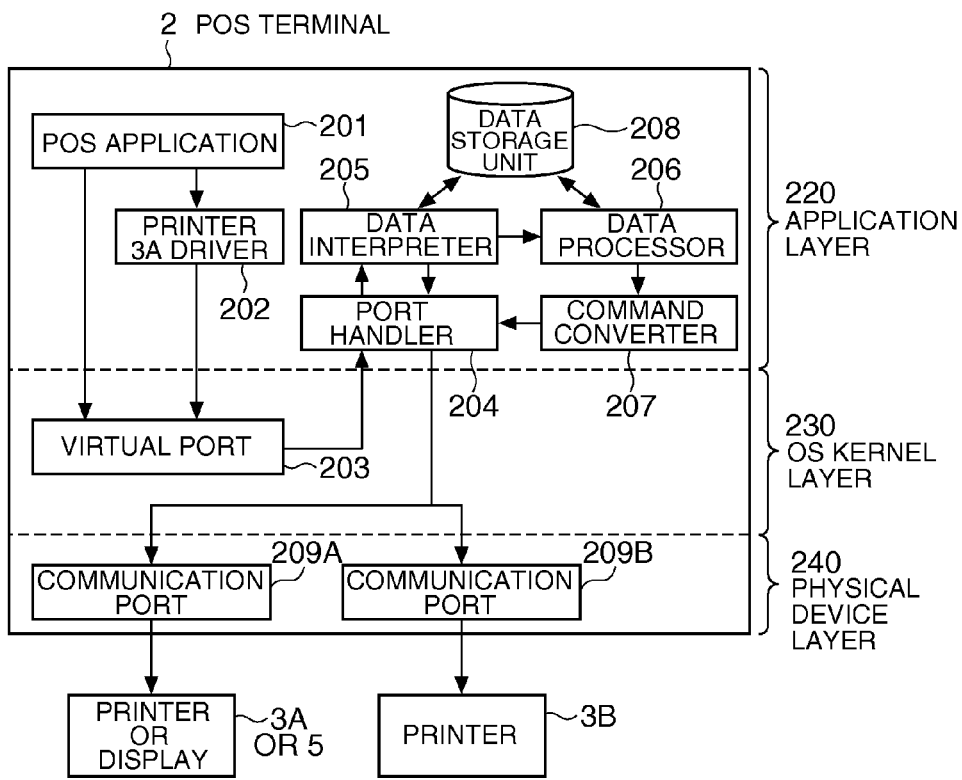
FIG. 2 is a function block diagram of a POS terminal device.

The functions of a POS terminal according to the first embodiment of the invention are described next with reference to FIG. 2. FIG. 2 is a function block diagram of the POS terminal.

The POS terminal 2 receives the device-specific data output from the POS application 201 at a virtual port 203 (data acquisition unit) of the OS kernel layer 230. The acquired data is received by the port handler 204 of the application layer 220, and the port handler 204 determines the specified output address based on analysis of the data. The port handler 204 then outputs the processed data to the identified communication port 209A/209B. By running this process, the POS terminal 2 can easily process distribution of device-specific data without modifying the POS application 201 program.

As shown in FIG. 2, the POS application 201 of the POS terminal 2 runs a process to generate and output the information printed on receipts and coupons and information displayed on the display 5 as described above, and the data generated at this time is the source data before the output address distribution process is run. The generated print data is in the format output directly to the printer 3A, that is, print data using the command system of the printer 3A (device), or data in the format passed to the driver 202 of the printer 3A. The former type is generated when generating simple print data for printing only text, for example. The display data is also data in the format output directly to the display 5.

The printer driver 202 is a printer driver for the printer 3A, and outputs the data output from the POS application 201 as print data based on the command system for the type of printer 3A (device) so that it can be received and printed by the printer 3A.

As shown in FIG. 2, the POS application 201 and printer driver 202 belong to the application layer 220 on which programs execute processes based on the operating system (OS) of the computer. Both the POS application 201 and printer driver 202 are rendered by programs stored in ROM that specify the content of each process, and a CPU and other hardware components that execute the process according to the program. The POS application 201 and printer driver 202 are also not newly added or modified by the invention, and use the same POS application and driver that are already deployed on an existing system.

The virtual port 203 receives the print data or display data (referred to herein as the "source data") output from the POS application 201 or printer driver 202 at the OS kernel layer 230 where the operating system resides before the data is passed to the communication port 209. The virtual port 203 passes the acquired source data to the port handler 204.

The port handler 204, data interpreter 205, data processor 206, command converter 207, and data storage unit 208 are the data processing units that run the output address distribution process using the source data. POS application 201 functionality is expanded by the processes executed by these parts.

The port handler 204 passes the source data received from the virtual port 203 to the data interpreter 205, and runs a process to receive data from the output address distribution process (referred to here as the "processed data") and outputs the processed data to the appropriate communication port 209.

The data interpreter 205 interprets the source data and determines the process content, and determines the communication port 209 to which the processed data is output.

The data processor 206 processes the source data according to the process content determined by the data interpreter 205.

The command converter 207 runs a process to change commands when the command system used by the printer 3A/3B connected to the communication ports 209A/209B specified by the source data differs from the command system of the printer 3A/3B connected to the communication port 209A/209B to which the processed data is output.

The data storage unit 208 stores data used by the data interpreter 205 and data processor 206, and stores a keyword database and a printer database. The keyword database stores text strings used as keywords and images, and links between the keywords and images and corresponding process content. The printer database stores the commands used by each printer 3, printer settings information, and information identifying the communication port 209 to which each printer 3 is connected. Note that the data storage unit 208 is a hard disk drive or other storage device.

Specific steps in the foregoing processes executed by the data processing units are described below.

Note that the virtual port 203, port handler 204, data interpreter 205, data processor 206, and command converter 207 are rendered by respective programs that implement the processes executed by each unit, and a CPU and other hardware components that execute the processes according to the programs.

The POS terminal 2 also includes communication port 209A and communication port 209B on the physical device layer 240. Communication port 209A is connected to printer 3A or the display 5, and communication port 209B is connected to printer 3B. In this embodiment of the invention communication port 209A is a serial communication COM port, and communication port 209B is a USB communication port for USB devices. The printers 3 may be different types of printers, and in this embodiment of the invention printer 3A is a monochrome printer, and printer 3B is a color printer, for example. Note, further, that the POS terminal 2 has two communication ports 209 and two printers connected to the POS terminal 2 in this embodiment of the invention, but the number of communication ports 209 and printers 3 is not so limited, and there may also be three or more of each. In addition, the communication ports 209 could both be USB communication ports, or other types of communication ports. The types of printers 3 could also be a combination of serial impact dot matrix (SIDM) printers and laser printers, or SIDM printers and thermal matrix (TM) printers, or other types of printers selected according to application.

Distribution Processing Method

Figure 3:
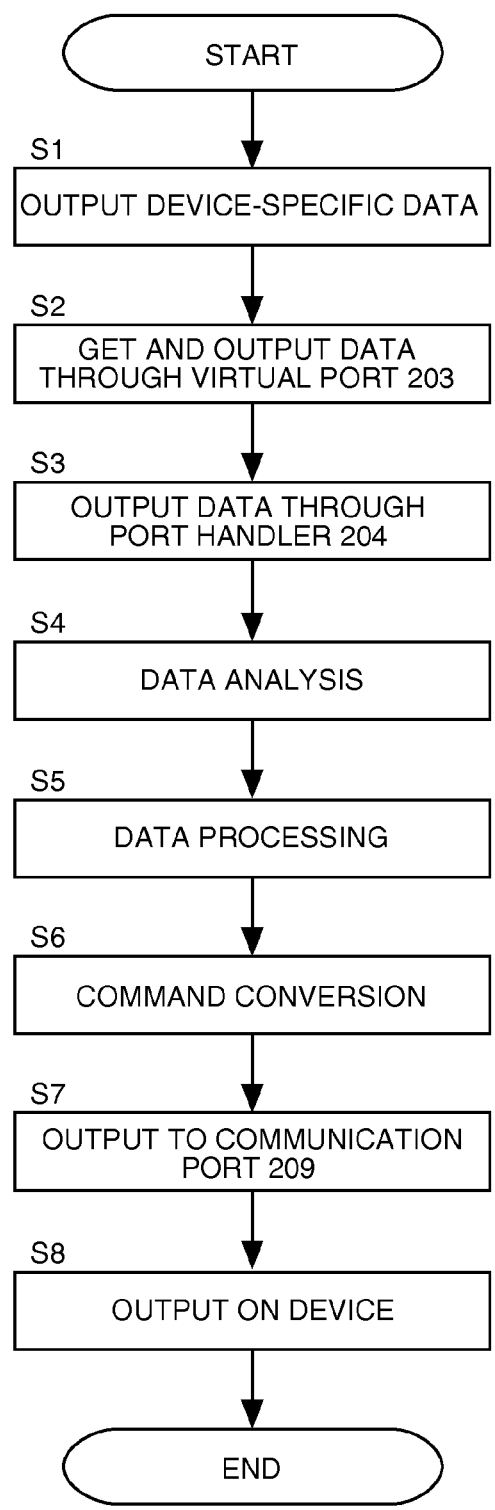
FIG. 3 is a flow chart of the output address distribution process.

The POS terminal 2 configured as described above runs an output address distribution process using the source data, and specific steps in this distribution processing method are described below with reference to FIG. 3. FIG. 3 is a flow chart of the steps in the output address distribution process. This example describes distributing print data as the device-specific data to printers 3A and 33.

As described above, the source data is output directly from the POS application 201 or through the printer 3A driver 202 (step S1). The source data is, for example, print data for a receipt to be output from printer 3A, communication port 209A is therefore specified as the communication port to the output address, and the source data contains commands for printer 3A.

The output source data is intercepted by the virtual port 203 before it reaches the specified communication port (communication port 209A in this example) (step S2). This process is achieved by configuring the registry (priority settings) so that data output to any communication port 209 is first received by the virtual port 203. This configuration change is made when the OS boots up. The received source data is then passed from the virtual port 203 to the port handler 204 on the application layer 220 (step S2).

The port handler 204 then passes the received source data to the data interpreter 205 (step S3). The data interpreter 205 interprets the commands in the source data, and analyzes the data content (step S4). The process content and addressed communication port 209 are determined based on the results of this analysis.

More specifically, the data interpreter 205 searches the source data for keywords stored in the data storage unit 208, determines the process content identified by the keywords, and determines which communication port 209 to address according to the process. This step is the process that distributes data to specific output addresses. The process content includes a process (distribution process) that divides the print content of the source data into plural parts and outputs the print content to the addresses appropriate to the content, a process (duplication process) that outputs the print content of the source data to plural addresses, and a process (allocation process) that changes the output address of the print data, and specific actions (process content) are preassigned to specific keywords. These processes are described more specifically below.

The output device communication port 209 selected by the data interpreter 205 is reported to the port handler 204, and the process content is reported to the data processor 206. Note that if the process content and output device are fixed irrespective of the source data, the data interpreter 205 is not required and the source data is passed from the port handler 204 to the data processor 206.

Next, the data processor 206 processes the source data (step S5). More specifically, the data processor 206 processes the print data according to the previously determined process content, and generates processed print data. Main process steps include dividing the print content and conversion to data conforming to the specifications of the output address. Specific examples of the process are described below. Data stored in the data storage unit 208, such as information in the printer database described above, is referenced as needed during data processing.

When there are plural processes to perform, the data processor 206 may include plural processing units corresponding to the individual process content. In addition, if the data interpreter 205 determines that data processing is not needed, the data processor 206 does not perform a processing operation.

When command conversion is required for the processed print data generated by the data processor 206, the command converter 207 runs a command conversion process (step S6). As described above, because the print data is generated with commands that depend on the printer 3 to which the print data is sent, commands must be converted according to the addressed output device when the commands in the source data differ from the commands of the output printer 3 identified as described above. Because the source data is generated with commands for printer 3A in this embodiment of the invention, the command conversion process is executed when the output device is changed to printer 3B (which is a different type of printer than printer 3A). The processed data is then passed to the port handler 204. Note that when command conversion is not necessary, the print data sent from the data processor 206 is passed to the port handler 204.

The port handler 204 then outputs the processed print data that was received to the selected communication port 209 (step S7). In this embodiment of the invention the port handler 204 outputs to communication port 209A and/or communication port 209B.

The print data is then sent from the communication port 209 to the connected printer 3, the printer 3 prints according to the received print data, and a receipt or other printout is output (step S8). For example, monochrome printing is output from printer 3A, and color printing is output from printer 3B.

Specific Example of the Output Address Distribution Process

The output address distribution process of the POS terminal 2 is executed as described in general terms above, and is described with reference to a more specific example below.

A specific example of the foregoing distribution process is described next. In this example the POS system is installed in a restaurant that has cooking stations in different locations according to what is prepared, and a printer 3 is installed at each cooking station. In this scenario the source data for outputting order tickets is output from the POS application 201. If the order data contains items that are prepared at different stations, the distribution process executes to output order tickets containing only those items that are prepared at each station from the printer 3 located at each station.

During this process the data interpreter 205 references data in the data storage unit 208, and using the text strings of the products contained in the source data as keywords, determines the output address of the cooking station (printer 3) linked to each product. The data processor 206 then allocates the content of the source data to each cooking station based on the output address determined for each product, and generates order ticket data for each cooking station. After the required conversion process is then executed by the command converter 207, print data for each order ticket is output from the port handler 204 to each output address.

In a similar situation, if the source data is for printing a receipt, print data may be output for printing a receipt accordingly while dividing and outputting the product information to the different cooking stations in the form of an order ticket.

Examples of the foregoing duplication process include simultaneously outputting a copy of the printed content (such as when a customer copy (original) and a store copy are desired), or when quickly printing plural copies of the same coupon.

When in this case the data interpreter 205 detects a specific keyword in the source data, such as a text string denoting a specific coupon, the data interpreter 205 determines that a duplication process is required, causing the data processor 206 to generate print content identical to the print data for output to plural printers 3. After the command converter 207 then performs the necessary conversion process, print data is output from the port handler 204 to each output address.

An example of the foregoing allocation process is when the output address is set to output to a printer 3 suitable to the type of printout. For example, if the printout is a receipt, data is processed for output from the monochrome printer 3A, but if the printout is a coupon, the data is processed for output from the color printer 3B. If the printout is a warranty card, the output address may be set to output from a SIDM printer to prevent colors from fading. This same process can also be used when the quality of the printing paper is changed according to the printout by providing printers 3 loaded with different types of paper.

When in this case the data interpreter 205 detects a specific keyword in the source data and identifies the type of printout, the data interpreter 205 determines the printer 3 according to the document type, and the data processor 206 generates print data output to the printer 3 accordingly. After the command converter 207 then performs the necessary conversion process, print data is output from the port handler 204 to the output address.

When a display 5 and printer 3B are connected to the POS terminal 2, a process that allocates (distributes) display data for the display and print data for the printer 33 to their respective addresses based on output from the POS application 201 to the common communication port 209A is performed. As described above, because the PUS application 201 is an application that is already deployed on existing POS terminals, printer 3 data and display 5 data are output from the PUS application 201 to the same communication port when the existing POS terminal has only a single serial communication port to which both a printer and display are serially connected.

The allocation process described above is also executed when, as shown in FIG. 2, a display 5 is connected to communication port 209A and a printer 32 is connected to communication port 209B in a modified POS terminal 2.

More specifically, similarly to when all of the output data is print data as described with reference to FIG. 3, the virtual port 203 first captures either the print data or the display data, and passes the received data through the port handler 204 to the data interpreter 205. The data interpreter 205 then determines whether the data is print data or display data, and determines the output device and the communication port 209 to which the device is connected according to the result. The data processor 206 and command converter 207 then run specific processes according to the output address, and output the processed data through the port handler 209 to the selected communication port 209. Print data is therefore output from printer 3B, and display data is output from the display 5.

When a device selection signal is output from the POS application 201, the data interpreter 205 can determine the communication port 209 of the output device (address) by simply detecting the device selection signal. More specifically, as shown in FIG. 2, in a configuration in which one display 5 and one printer 3B are connected, the output device can be determined by outputting the device selection signal, and the communication port 209 used can be determined based on the presence of this signal.

As described above, a POS terminal 2 according to this embodiment of the invention can apply an output address distribution process to data output from the POS application 201. A POS terminal and POS system that do not perform such a process can be improved to be the POS terminal 2 and POS system described herein by a relatively simple method.

Embodiment 2

A POS terminal according to a second embodiment of the invention is described next with reference to FIG. 4.

Figure 4:
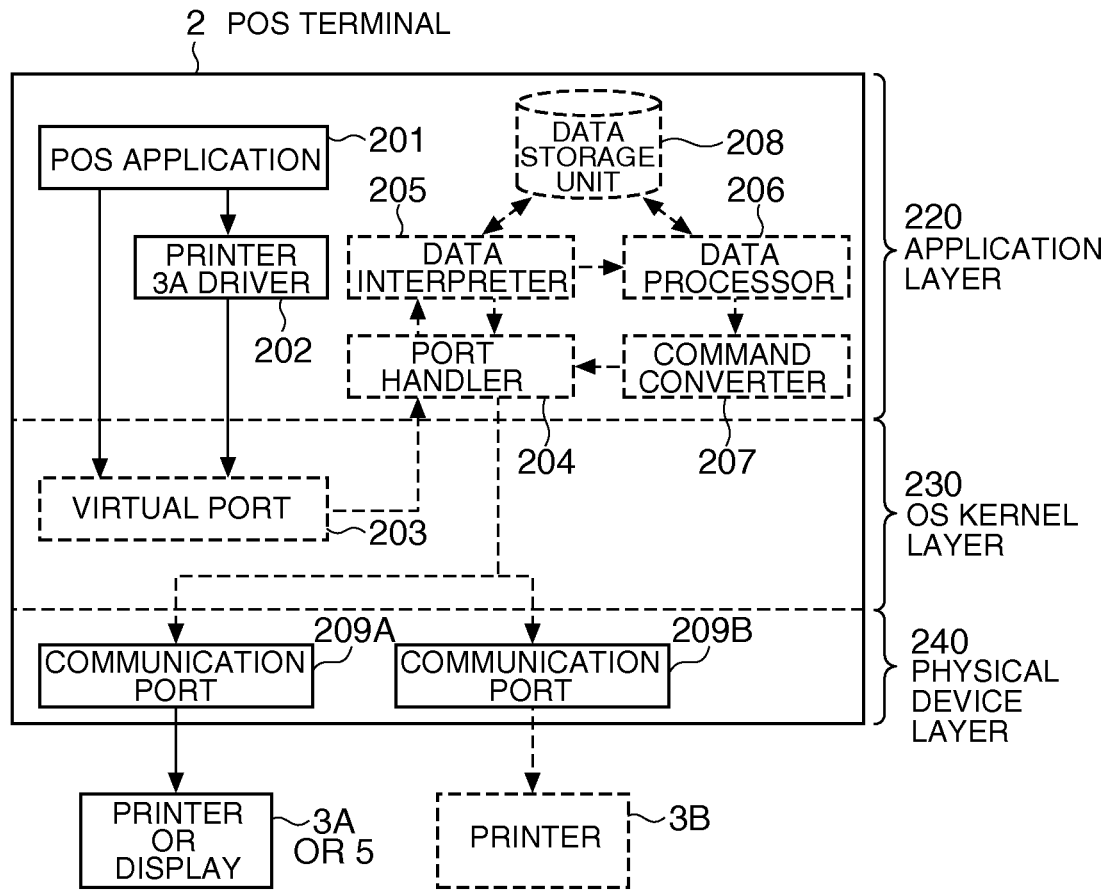
FIG. 4 describes an improvement of the POS system.

FIG. 4 is a block diagram showing an improvement of the POS system. FIG. 4 shows the same functional components as in FIG. 2 with the solid lines indicating the POS terminal and POS system before the modification described below. Note that like parts and content are identified by the same reference numerals in the first and second embodiments, and further description thereof is omitted.

Before improvement, the data output from the POS application 201 directly or through the printer driver 202 is received by communication port 209A, and is output from printer 3A or the display 5. By adding the parts shown in dotted lines to this system, the POS terminal 2 and POS system described above can be achieved.

More specifically, the data distribution processing method described above enables expanding the functions of existing POS systems without modifying the existing POS application 201 by adding the data processing program, the data stored in the data storage unit 208, and a new printer 3B as described above. This improvement (addition) can be done by installing a new printer 3B and printer driver software including the data and data processing program described above. Note, further, that a new printer 3A and display 5 may be added, or the computer used for the POS terminal 2 could be replaced with a new computer without changing the existing POS application 201 program.

As described above, the data distribution processing method according to this embodiment of the invention enables expanding POS system functionality by including an output address distribution process using a method that does not involve modifying the existing POS application program. In addition, because the main process used to enable this operates at the computer application layer, developing programs that execute a wide range of processes is simple.

User convenience is also improved by using this data distribution processing method because output can be more appropriately controlled for the user.

Furthermore, output can also be accelerated in certain cases because output is distributed by using the data distribution processing method of the invention. Output can be further accelerated by updating the computer or communication method.

It will be obvious to one with ordinary skill in the related art that the invention is not limited to the foregoing embodiments, and can be modified and improved in many ways. Examples of such modifications are described below.

Modification 1

The POS server 1 is connected to plural POS terminals 2 in the embodiment described above, but the invention is not so limited and can be adapted to the environment in which the POS terminal and printers, for example, are deployed.

Modification 2

The foregoing embodiment of the invention describes a POS system by way of example, but the invention is not limited to POS systems and can be applied to other types of systems having a specific application including outputting printed materials from a printer, including systems used in hospitals and shipping companies, for example. The invention is particularly useful when modifying an existing application program is difficult.

Modification 3

The POS application program and distribution processing program are stored in ROM in the foregoing embodiment by way of example, but the invention is not so limited. More specifically, storing these programs is not limited to ROM devices, and may use any suitable tangible recording medium, including hard disk drives, optical discs, magneto-optical discs, and flash memory. The steps of the processing method of the foregoing embodiment can also be provided as a computer-executable program. This program can also be provided stored on a suitable tangible recording medium or non-transitory recording medium.

The scope of the invention is not limited to the foregoing embodiments, and includes the invention described in the accompanying claims and equivalents thereof.

What is claimed is:

1. A distribution processing method that runs on a computer, said computer operates according to an operating system, executes an operating system kernel layer, executes a specific process according to an application on an application layer, has two or more communication ports, and applies a distribution process to device-specific data output from the application, the distribution processing method comprising:

a data acquisition step in which the computer acquires device-specific data output to one specific communication port at the operating system kernel layer before the device-specific data is received at the communication port; and a data processing step in which the computer analyzes the device-specific data acquired in the data acquisition step at the application layer, determines an output device to which the device-specific data is output based on the data analysis, and outputs the device-specific data to a communication port to which the output device is connected.

2. The distribution processing method described in claim 1, wherein:

the output device is a printing device and a display device; and the device-specific data output from the application is data for the printing device or data for the display device.

3. The distribution processing method described in claim 1, wherein:
there are at least two devices; and
when a device selection signal is contained in the device-specific data output from the application, the output device is determined based on the device selection signal.

4. A non-transitory computer-readable recording medium that records a program that causes a computer to execute the steps of the data distribution processing method described in claim 1.

5. A distribution processing device that is a computer that operates according to an operating system on the operating system kernel layer, executes a specific process according to an application on an application layer, has two or more communication ports, and applies a distribution process to device-specific data output from the application, the distribution processing device comprising:
a data acquisition unit that acquires device-specific data output to one specific communication port at the operating system kernel layer before the device-specific data is received at the communication port; and
a data processing unit that analyzes the device-specific data acquired by the data acquisition unit at the application layer, determines an output device to which the device-specific data is output based on the data analysis, and outputs the device-specific data to a communication port to which the output device is connected.

6. The distribution processing device described in claim 5, wherein:
the output device is a printing device and a display device; and
the device-specific data output from the application is data for the printing device or data for the display device.

7. A print data processing method that runs on a computer, said computer operates according to an operating system on an operating system kernel layer, executes a specific process according to an application on an application layer, has two or more communication ports, and processes print data output from the application, the print data processing method comprising:
a data acquisition step in which the computer acquires the print data output to a specific communication port at the operating system kernel layer before the print data is received at the communication port as acquired print data; and
a print data processing step in which the computer analyzes the print data acquired in the data acquisition step at the application layer, determines one or more communication ports to which the print data is output based on the data analysis, converts the print data to data suitable for the device connected to the identified communication port, and outputs the converted print data to an identified communication port.

8. The print data processing method described in claim 7, wherein:
the communication port is determined in the print data processing step based on a text string or image detected in the acquired print data.

9. The print data processing method described in claim 7, wherein:
two or more communication ports are identified as the communication ports to which the print data is output, and the content of print data output to each communication port is a subset of the acquired print data content.

10. The print data processing method described in claim 7, wherein:
two or more communication ports are identified as the communication ports to which the print data is output, and print data of the same content is output to each communication port.

11. The print data processing method described in claim 7, wherein:
one communication port is determined based on print data content as the communication port to which the print data is output.

12. A print data processing device that is a computer that operates according to an operating system on an operating system kernel layer, executes a specific process according to an application on an application layer, has two or more communication ports, and processes print data output from the application, the print data processing device comprising:
a data acquisition unit that acquires print data output to a specific communication port at the operating system kernel layer before the print data is received at one of the communication ports; and
a print data processing unit that analyzes the print data acquired by the data acquisition unit at the application layer, determines one or more communication ports to which the print data is output based on analysis of the print data processing unit, converts the print data to data suitable for a device connected to an identified communication port, and outputs the converted print data to the identified communication port.

13. The print data processing device described in claim 12, wherein:
the communication port is determined in the print data processing unit based on a text string or image detected in the acquired print data.

14. The print data processing device described in claim 12, wherein:
two or more communication ports are identified as the communication ports to which the print data is output, and the content of print data output to each communication port is a subset of the acquired print data content.

15. The print data processing device described in claim 12, wherein:
two or more communication ports are identified as communication ports to which the print data is output, and print data of having a same content is output to each communication port.

16. The print data processing device described in claim 12, wherein:
one communication port is determined based on print data content as the communication port to which the print data is output.

* * * * *